United States Patent
Hong et al.

(10) Patent No.: US 7,321,016 B2
(45) Date of Patent: Jan. 22, 2008

(54) METHOD OF PRODUCING STYRENE POLYMERS USING HIGH SPEED CATALYTIC DISPERSION TECHNOLOGY

(75) Inventors: Mooho Hong, Seoul (KR); Sang Hoon Lee, Daejeon (KR); Boo Gon Woo, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 11/396,763

(22) Filed: Apr. 3, 2006

(65) Prior Publication Data

US 2006/0247398 A1 Nov. 2, 2006

(30) Foreign Application Priority Data

Apr. 2, 2005 (KR) ............. 10-2005-0027798
Mar. 28, 2006 (KR) ............. 10-2006-0027977

(51) Int. Cl.
*C08F 2/02* (2006.01)
*C08F 12/04* (2006.01)

(52) U.S. Cl. ............. 526/88; 526/346; 526/347.1; 526/902; 526/919

(58) Field of Classification Search ............. 526/88, 526/346, 347.1, 902, 919
See application file for complete search history.

(56) References Cited

U.S. PATENT DOCUMENTS

| | | | |
|---|---|---|---|
| 5,037,907 A | 8/1991 | Imabayashi et al. | 526/88 |
| 5,254,647 A | 10/1993 | Yamamoto et al. | 526/65 |
| 5,306,790 A * | 4/1994 | Imabayashi et al. | 526/68 |
| 5,484,862 A | 1/1996 | Siddall et al. | 526/88 |
| 5,597,879 A * | 1/1997 | Ase et al. | 526/65 |
| 5,942,589 A * | 8/1999 | Wunsch et al. | 526/346 |
| 6,242,542 B1 | 6/2001 | Beaudoin | 526/87 |
| 6,245,865 B1 * | 6/2001 | Lee et al. | 526/65 |
| 6,881,801 B2 * | 4/2005 | Dolle et al. | 526/136 |

FOREIGN PATENT DOCUMENTS

| | | |
|---|---|---|
| EP | 1493760 | 1/2005 |
| KR | 100211854 | 5/1999 |
| WO | WO 0047643 | 8/2000 |

* cited by examiner

*Primary Examiner*—Fred Teskin
(74) *Attorney, Agent, or Firm*—Cantor Colburn LLP

(57) ABSTRACT

Provided is a method of preparing styrene polymers, the method comprising: homogeneously mixing a styrene monomer; a cocatalyst mixture of Group 13 metal-containing organic metal compound cocatalyst and an inert organic solvent; and a catalyst mixture of a metallocene catalyst and the inert organic solvent using a high speed homogenizing mixer to obtain a homogenized mixture; and providing the homogenized mixture to a reactor to initiate polymerization. In this method, catalyst is quickly dispersed among monomers using a high speed homogenizing mixer so that formation of gel, which occurs when a syndiotactic styrene polymer is produced, can be fundamentally prevented. In addition, a styrene polymer prepared using the method has high activity, good stereoregularity, and uniform molecular distribution.

19 Claims, 4 Drawing Sheets

METHOD OF PRODUCING STYRENE POLYMERS USING HIGH SPEED CATALYTIC DISPERSION TECHNOLOGY

CROSS-REFERENCE TO RELATED PATENT APPLICATIONS

This application claims the benefit of Korean Patent Application No. 10-2005-0027798, filed on Apr. 2, 2005, and Korean Patent Application No. 10-2006-0027977, filed on Mar. 28, 2006, Korean Intellectual Property Office, the disclosure of which is incorporated herein in its entirety by reference.

BACKGROUND OF THE INVENTION

1. Field of the Invention

The present invention relates to a method of preparing styrene polymer, and more particularly, to a method of preparing styrene polymer having high syndiotacticity.

2. Description of the Related Art

In general, styrene polymers are prepared through a polymerization reaction using metallocene catalysts. Metallocene catalysts are activated by alkylaluminum compounds, for example, methylaluminoxane, and contain Group 4 transition metal bonded to a cycloalkandienyl group or a derivative thereof.

Preparation of styrene polymer having syndiotacticity accompanies gelation, and thus the gel should be prevented from growing into a whole lump of gel, which is well known in the art. For this purpose, U.S. Pat. No. 5,037,907 discloses a vertical tank type reactor including a mixer that scratches an inner wall of the reactor, and a method of preparing styrene polymer using the reactor.

According to U.S. Pat. No. 5,037,907, by using the reactor as a polymerization medium, a great amount of polymerization particles are dispersed in a liquid state of monomers to induce polymerization at the particle surface, and thus in theory, quick formation of polymer lumps can be prevented. In fact, however, formation of such large particles or lumps cannot be prevented in a low conversion region. In particular, when polymers are insufficiently mixed, polymers are more likely to be lumped.

U.S. Pat. No. 5,254,647 discloses a wiped surface reactor that is used to prepare styrene polymers. The wiped surface reactor mixes monomers using two pairs of conventional screws to prevent coagulation at low conversion range, where particle growth begins rapidly. Then, the agitated styrene polymers are transferred to a powder bed type reactor. As a result, a high conversion ratio can be obtained.

Although the powder bed-type reactor shows low mixing efficiency, a relatively uniform product can be obtained. In addition, by using the wiped surface reactor, rapid polymerization is prevented and thus it is possible to control the polymerization with ease. However, the rotation of the reactor is limited according to the structure of paddles installed in the cylinder of the reactor. As a result, the reactants loaded into the cylinder have insufficient residence time for reaction. In addition, the use of the screw structure leads to a reduced treatment capacity and high manufacturing costs.

As other references relating to manufacturing of styrene polymers, there are U.S. Pat. No. 5,484,862 disclosing an improved liquid phase powder bed type reactor and U.S. Pat. No. 6,242,542 disclosing back-mixed reactors that are reactors in series or parallel reactors.

Conventional methods of preparing styrene polymers having syndiotacticity, however, accompanies formation of gel, and large particles having an average particle diameter of 2 mm or more are attached to an inner wall or agitator of a reactor in a lump form. As a result, the transfer of a reactant is difficult and in the subsequent reaction, mixing is difficult.

Accordingly, preparation of styrene polymers according to these patents described above requires expensive apparatuses and thus the prepared styrene polymers has low polymerization productivity. In addition, there is a danger of deterioration of the product property caused by the incapability of preventing the gelation.

SUMMARY OF THE INVENTION

The present invention provides a method of preparing styrene polymer having high activity, high stereoregularity, and a uniform molecular weight distribution by preventing gelation that occurs during the polymerization.

The present invention also provides a styrene polymer prepared using the method.

According to an aspect of the present invention, there is provided a method of preparing styrene polymer, the method comprising: homogenously mixing a styrene monomers; a cocatalyst mixture of Group 13 metal-containing organic metal compound cocatalyst and an inert organic solvent; and a catalyst mixture of a metallocene catalyst and the inert organic solvent using a high speed homogenizing mixer to obtain a well-mixed and finely homogenized mixture; and providing the homogenized mixture to a reactor to initiate polymerization.

According to another aspect of the present invention, there is provided a styrene polymer prepared using the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Inventors of the present invention found that in order to prepare a syndiotactic styrene polymer, gelation occurring when a conversion ratio is in the range of 10-20% should be fundamentally prevented and such prevention can be obtained by completely homogenizing a mixture of a cocatalyst and a catalyst at a time when catalyst activity initiates and polymerization starts. If the mixture of the cocatalyst and the catalyst are incompletely homogenized during the initial polymerization, the viscosity of monomers rapidly increases as polymerization proceeds. As a result, dispersion of the catalyst is difficult and thus locally, non-uniformly dispersed catalysts initiate polymerization and gel is formed. Ultimately, the entire reaction products are clogged into one large lump of gel. Accordingly, by finding reasons for the gel formation, inventors of the present invention suggested a method of preparing syndiotactic styrene polymer having high quality and a good molecular weight distribution in which the gelation was fundamentally prevented.

For this purpose, a polymer polymerization system according to an embodiment of the present invention includes a homogenizing mixer that homogenizes a monomer, a cocatalyst, and a catalyst, which are used to form a polymer, in a short time, and a reactor in which the homogenized mixture is formed in a polymer powder.

According to an embodiment of the present invention, a mixture of a monomer, a cocatalyst, and a catalyst are homogenized at high speed using T25 series batch high speed homogenizing mixer(S25KV-25F, IKA) and T50 series batch type high speed homogenizing mixer(S50KV-50F, IKA). In addition, a mixture of a monomer and a cocatalyst, and the catalyst mixture are continuously homogenized using a T25 series continuous type high speed homogenizing mixer (S25KV-F-IL, IKA). These high speed homogenizing mixers are commercially available and kinds and structures thereof are not limited to the present invention.

According to an embodiment of the present invention, a styrene polymer is prepared using a plurality of high speed homogenizing mixers. According to a connection type of the high speed homogenizing mixers, various methods can be used. For example, a styrene monomer and a cocatalyst mixture are homogenized using a first high speed homogenizing mixer, and then the homogenized product and a catalyst mixture are homogenized using a second high speed homogenizing mixer. Alternatively, a styrene monomer and a cocatalyst mixture are homogenized to form a first homogenized product and a styrene monomer and a catalyst mixture are homogenized to form a second homogenized product, using a pair of first high speed homogenizing mixers respectively, and then the fist and second homogenized products are homogenized using a second high speed homogenizing mixer.

The rotation speed of the high speed homogenizing mixer may be in the range of 10-100,000 rpm, for example, 100-50,000 rpm. When the rotation speed of the high speed homogenizing mixer is less than 10 rpm, dispersion and mixture homogenization are not suitable for realizing the effect of the present invention. On the other hand, when the rotation speed of the high speed homogenizing mixer is greater than 100,000 rpm, excess dispersion and mixture homogenization are obtained, which may affect mechanical elements of the mixer. When the rotation speed of the high speed homogenizing mixer reaches within the range of 100 rpm-100,000 rpm, it is possible to select suitable speed of the mixer according to the condition and scale of the mixing. In particular, when the rotation speed of the high speed homogenizing mixer is in the range of 4000 rpm-50,000 rpm, effective homogenization can be obtained.

Dispersion and homogenization according to the present invention is similar to a conventional premixing in that a reaction is promoted by increasing a degree of dispersion between a monomer and a catalyst. However, dispersion and homogenization according to the present invention is different from a conventional premixing in that the catalyst are homogeneously dispersed among monomers in a short time using the high speed homogenizing mixer to perform polymerization. In general, the premixing refers to a slow mixing of reactants in a mild condition for a long time to prepare a well mixed mixture for a reaction. However, as for styrene polymers, if the catalyst is not homogeneously dispersed in a short time using a high speed homogenizing mixer before polymerization is initiated by the catalyst, the catalyst fails to uniformly mix with and disperse among monomers. As a result, the catalyst has a non-uniform concentration grade and thereby polymer gelation quickly starts and intercohesion between gel particles is more promoted. Therefore, the entire reactant is clogged in one lump and polymerization cannot be performed. Further, when dispersion and loading are slowly performed, polymerization may be performed during the mixing process, and thus the homogenizing mixer and an inlet of the reactant can be clogged. In addition, due to the difference of the polymerization reaction speeds of a monomer-catalyst mixture used during initial dispersion and a monomer-catalyst mixture used during latter dispersion, gel that is formed from the initially used mixture acts as a gel seed and promotes cohesion of gel particles. As a result, the entire reactant can also be clogged in one gel lump. Due to these problems, quick mixing and dispersing of a monomer and a catalyst is essential for polymerization, which is the difference when compared with the conventional premixing.

A homogenizing method according to embodiments of the present invention will now be describe with reference to the attached drawings.

Figure 1:
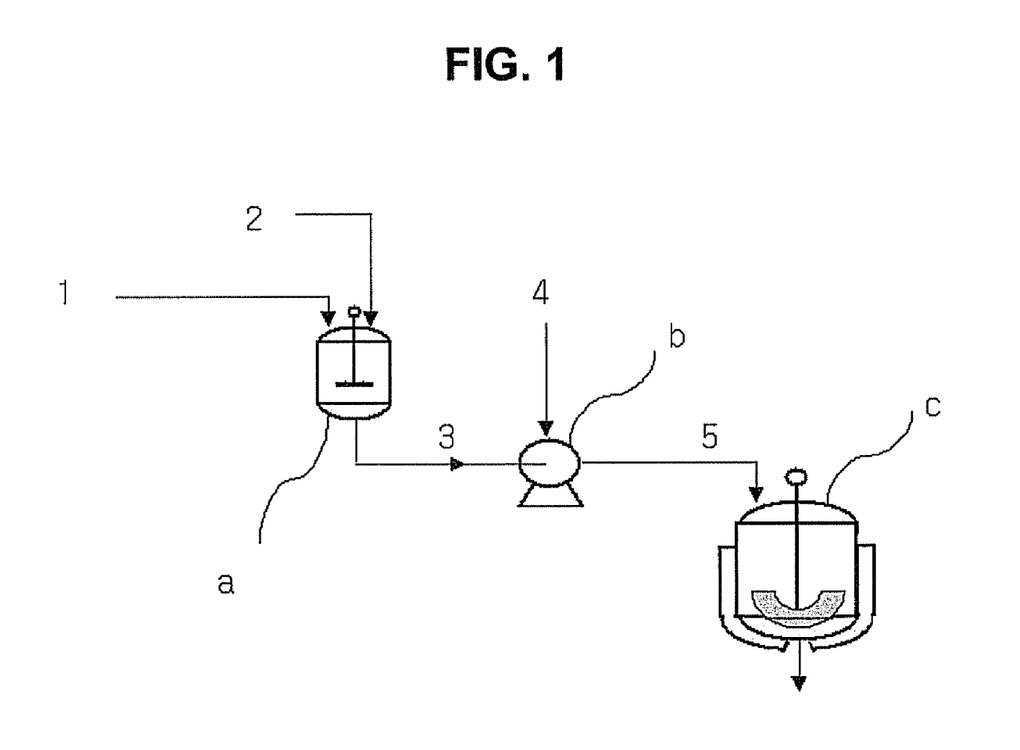
FIG. 1 is a schematic view illustrating a method of preparing a styrene polymer using a high speed homogenizing mixer and a reactor according to an embodiment of the present invention.

FIG. 1 is a method of preparing a syndiotactic styrene polymer according to an embodiment of the present invention in which a mixture of a monomer 1 and a cocatalyst mixture 2, and a catalyst mixture 4 are loaded to a high speed homogenizing mixer (S25KV-25F-IL, IKA)-mounted reactor b for rapid homogenization, and the homogenized product is loaded to a reactor c connected to the reactor b in series.

Figure 2:
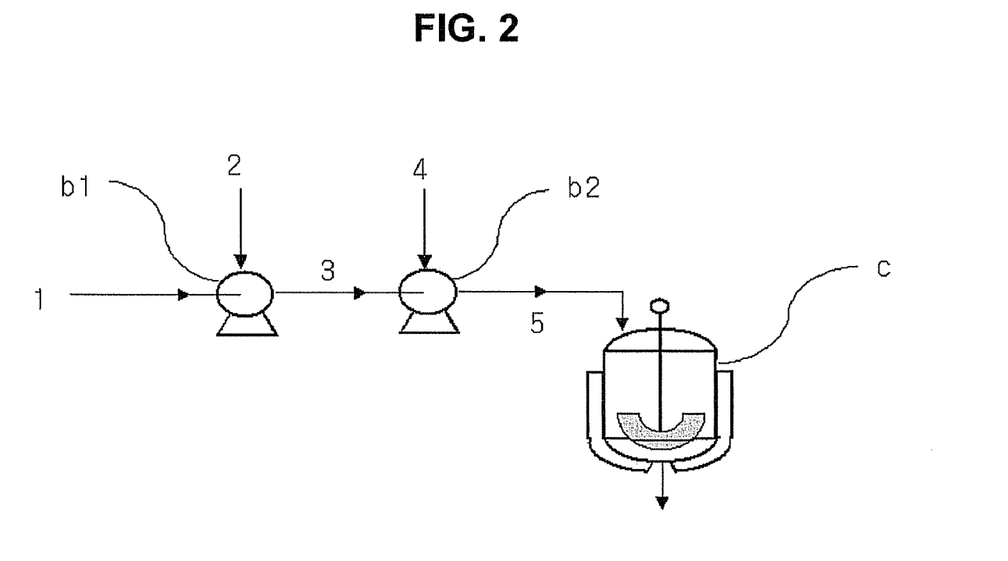
FIG. 2 is a schematic view illustrating a method of preparing a styrene polymer using a plurality of high speed homogenizing mixers connected in series according to another embodiment of the present invention.

FIG. 2 is a method of preparing a syndiotactic styrene polymer according to another embodiment of the present invention in which a monomer 1 and a cocatalyst mixture 2 are homogenized using a first high speed homogenizing mixer b1, the resultant homogenized mixture flow 3 and a catalyst mixture 4 are homogenized using a second high speed homogenizing mixer b2, and the final homogenized mixture flow 5 is loaded to a reactor c in series.

Figure 3:
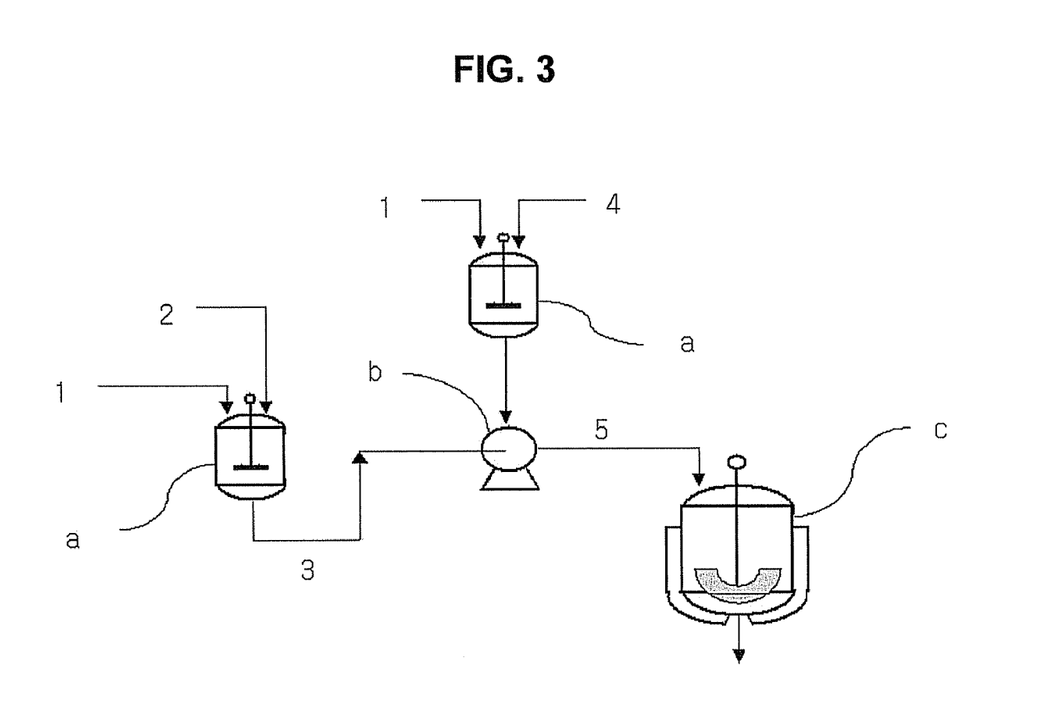
FIG. 3 is a schematic view illustrating a method of preparing a styrene polymer using a high speed homogenizing mixer and a reactor according to another embodiment of the present invention.

FIG. 3 is a view illustrating a method of preparing a syndiotactic styrene polymer according to another embodiment of the present invention in which a mixture of a monomer 1 and a cocatalyst mixture 2 prepared using a reactor a and a mixture of a monomer 1 and a catalyst mixture 4 prepared using a reactor a are homogenized using the homogenizing mixer b, and the resultant homogenized mixed flow 5 is loaded to a reactor c.

Figure 4:
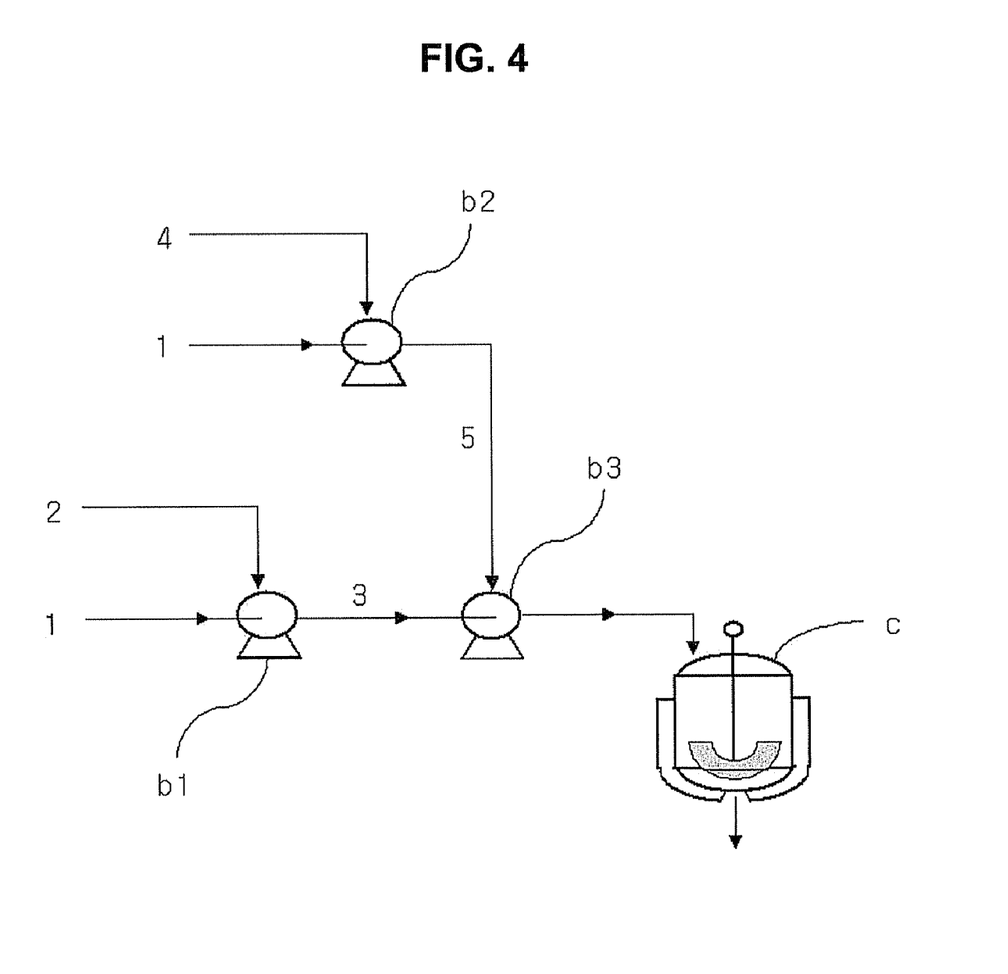
FIG. 4 is a schematic view illustrating a method of preparing a styrene polymer using a plurality of high speed homogenizing mixers connected in series and in a parallel according to another embodiment of the present invention.

FIG. 4 is a view illustrating a method of preparing a syndiotactic styrene polymer according to another embodiment of the present invention in which a plurality of high speed homogenizing mixers b1, b2, and b3 connected in parallel and in series are used instead of the reactor a.

According to an embodiment of the present invention, the reactor is structured such that a high shear property is retained to prevent cohesion of particles as homogenized monomers grow into polymers.

The reactor includes: a main body having an inner space including: an inlet to which the homogenized mixture is fed; and an outlet from which a reaction product is discharged; a mixer mixing the homogenized mixture installed in the main body; and a temperature controlling unit connected to the main body which controls a reaction temperature by circulating heated or refrigerated oil. The mixer: an anchor is attached to the mixer, an interval between the anchor and an inner wall of the reactor is minimized, and heated or refrigerated oil circulates along the anchor. The mixer is a vertical tank type reactor to which an anchor blade is attached, and a center axis thereof is removed to prevent attachment of a polymer to the mixer due to a reduced linear speed when mixing. In addition, the distance between a mixing blade and an inner wall of the reactor is decreased as small as possible such that the reactant products are not attached to the inner wall of the reactor. Furthermore, heated oil and refrigerated oil are circulated along the mixing blade so that the attachment of polymers to the mixer can be additionally prevented.

The present invention will now be described in detail with reference to FIG. 1.

A refined styrene monomer is homogeneously mixed with a cocatalyst mixture of a Group 13 metal-containing organic metal compound cocatalyst and an inactive organic solvent and a catalyst mixture of a metallocene catalyst and an inactive organic solvent using a high speed homogenizing mixer, and the homogeneously mixed product is loaded to a reactor.

The styrene monomer is represented by $PhCH=CH_2$ where Ph is a phenyl group having at least one substituent that has hydrogen; halogen; or at least one atom selected from C, O, P, S, and Sn.

Examples of the styrene monomer include alkylstyrene, halogenized styrene, halogen-substituted alkylstylene, alkoxystyrene, vinylbiphenyl, vinylphenyl naphthalene, vinylphenylpyrene, vinylphenylanthracene, trialkylsilylvinylbiphenyl, alkylsilylstyrene, alkylesterstyrene, carboxymethylstyrene, vinylbenzenesulfonic acid ester, vinylbenzyldialkoxyphosphate, divinylbenzene such as p-divinylbenzene and m-divinylbenzene, trivinylbenzene, and aryl styrene, and the like.

The rotation speed of the high speed homogenizing mixer may be in the range of 10-100,000 rpm, for example, 100-50,000 rpm, specifically 1000-50,000 rpm. When the rotation speed of the high speed homogenizing mixer is less than 10 rpm, dispersion and mixture homogenization are not suitable for realizing the effect of the present invention. On the other hand, when the rotation speed of the high speed homogenizing mixer is greater than 100,000 rpm, excess dispersion and mixture homogenization are obtained, which may affect mechanical elements of the mixer. When the rotation speed of the high speed homogenizing mixer reaches within the range of 100 rpm-100,000 rpm, it is possible to select suitable speed of the mixer according to the condition and scale of the mixing. In particular, when the rotation speed of the high speed homogenizing mixer is in the range of 4000 rpm-50,000 rpm, effective homogenization can be obtained.

The metallocene catalyst is used to prepare a styrene polymer having high syndiotacticity, and can be any metallocene catalyst that is well known in the art.

In general, the metallocene catalyst is a bonding product of a Group 4 transition metal compound and a ligand selected from one or two cycloalkyldienyl group and a derivative thereof. The Group 4 transition metal compound shown in Periodic Table can be a compound of Ti, Zr, Hf, V, Nb, or Ta, for example, a Ti compound. The metallocene catalyst used in an embodiment of the present invention can be pentamethylcyclopentadienyltitaniumtrimetoxide, pentamethylcyclopentadienyltitaniumtrichloride, or the like.

The amount of the metallocene catalyst may be in the range of 0.00005-0.02 mol %, for the total amount of the metallocene catalyst and the styrene monomer. When the amount of the metallocene catalyst is less than 0.00005 mol %, polymerization activity decreases substantially and thus it is expensive to purify the product. On the other hand, the amount of the metallocene catalyst is less than 0.02 mol %, the molecular weight of the polymer decreases and it is difficult to control polymerization due to a great amount of heat generated during the polymerization.

The metallocene catalyst may be used together with a cocatalyst, which is an organic compound containing at least one compound selected from alkylaluminoxane, an alkylaluminum compound, and a borate compound.

The alkylaluminoxane can be a modified methylaluminoxane (MMAO) having high stability containing methylaluminoxane (MAO) and an alkylaluminum compound. Examples of the alkylaluminum compound include trimethylaluminum, triethylaluminum, dimethylaluminumchloride, diethylaluminumchloride, triisobutylaluminum (TIBAL), tri(n-butyl)aluminum, tri(m-propyl)aluminum, and triisopropylaluminum, and the like. For example, the alkylaluminum compound is TIBAL. Examples of the borate compound include borane, triphenylcarbonium tetra(pentafluorophenyl)borate, o-cyano-N-methylpyridinium tetra(pentafluorophenyl)borate, tri(pentafluorophenyl)boron, 1,1-dimethylferrocenium-tetra(pentafluorophenyl)borate, benzyldimethylferrocenium tetra(pentafluorophenyl)borate, and the like.

The amount of the cocatalyst, based on the amount of the metal contained in the cocatalyst, may be in the range of 1-2,000 mol, preferably 10-1,000 mol, for 1 mole of metal comprised in the metallocene catalyst. When the amount of the cocatalyst is less than 1 mol, the absolute amount of the cocatalyst is too small and thus the catalyst is difficult to activate. On the other hand, when the amount of the cocatalyst is greater than 2,000 mol, excess cocatalyst is present even after the cocatalyst participates in catalyst activation and thereby it is difficult to control a polymerization speed during the polymer preparing process and the average molecular weight of the polymer decreases.

The metallocene catalyst and the cocatalyst are used in a mixed form with an inactive organic solvent. Examples of the inactive organic solvent include pentane, hexane, cyclohexane, heptane, octane, nonane, decane, benzene, pentafluorobenzene, toluene, and the like.

The concentration of the catalyst mixture may be in the range of 0.00001-1.0 M, preferably 0.0001-0.1 M.

When the concentration of the catalyst mixture is less than 0.0001 M, the relative amount of the inactive organic solvent used increase and thus polymerization effect decreases. On the other hand, when the concentration of the catalyst mixture is greater than 0.1 M, the amount of the catalyst mixture used is too small compared to that of the monomer and maintaining a constant input ratio is hardly possible.

The polymerization reaction may be performed at a temperature of 0-120° C., preferably 30-100° C. When the reaction temperature is lower than 0° C., the reactivity decreases or a conversion rate is low. On the other hand, when the reaction temperature is higher than 120° C., the catalyst activity decreases and more monomers are thermally modified.

The reaction time may be in the range of 10 min.-600 min., preferably 30 min.-300 min.

The styrene polymer having syndiotactic configuration prepared as described above has a polymerization conversion rate of 10-100%, preferably 30-90%, and has a weight average molecular weight of 1,000-2,000,000, preferably 10,000-1,000,000. As a result of $C^{13}$ NMR analysis, the styrene polymer has a syndiotactic stereoregularity of 75% or higher, preferably 90% or higher.

The present invention will be described in further detail with reference to the following examples. These examples are for illustrative purposes only and are not intended to limit the scope of the present invention.

EXAMPLE

Example 1

A high speed homogenizing mixer (S25 KV-25F, IKA)-mounted 5 L vertical, tank type reactor and an anchor mixer-mounted 20 L vertical, tank type reactor were connected in series, the inner temperature of these reactors was set at 75° C., and these reactors were vacuumed overnight. Then, the reactors are thrice purged using high purity argon gas. 37.5 ml of 1.0M triisobutylaluminum toluene solution (Aldrich) and 49.2 ml of methylaluminoxane toluene solution containing 4.68 wt % aluminum (Albermarl) were sequentially mixed with 4,000 ml of refined stylene monomer. 37.5 ml of 0.005 M pentamethylcyclopentadienyltitaniumtrimethoxide (Cp*Ti(OME)$_3$) toluene solution was mixed with the mixed product using the high speed homogenizing mixer at 24,000 rpm for 1 minute. Subsequently, a valve of a lower end of the high speed homogenizing mixer was opened and the resultant mixture was quickly loaded to the 20 L reactor. Then, the reaction was initiated while the rotation speed of a mixing blade was maintained at 80 rpm.

The reaction was performed for one hour and the reactor was evacuated to completely collect unreacted monomers. Then, a valve of the reactor was opened to obtain a polymer powder. The amount of polymer that was not collected and attached to an innerwall of the reactor and the mixer was negligible. The obtained polymerization product was sufficiently washed using excess methanol containing a small amount of HCl, and dried in a vacuum oven. The resultant product was quantified. As a result, the powder type polymerization product had an amount of 2180 g (Yield: 60.4%). The polymerization product has a weight average molecular weight of 398,000 and a molecular weight distribution of 2.81. As a result of NMR analysis, the polymerization product showed a syndiotactic stereoregularity of 93% or more.

Example 2

The experimental conditions were the same as in Example 1, except that the rotation speed of the high speed homogenizing mixer was 11,000 rpm. After the reaction was completed, the polymerization product was washed, dried, and quantified. As a result, the amount of the resultant polymerization product was 2102 g (Yield: 58.2%). The amount of polymer that was not collected and attached to an innerwall of the reactor and the mixer was negligible. The polymerization product had a weight average molecular weight of 405,000, a molecular weight distribution of 2.74, and a syndiotactic stereoregularity of 93% or more.

Example 3

The experimental conditions were the same as in Example 1, except that a high speed homogenizing mixer (S50 KV-50F) having a larger scale than the S25 KV-25F was used instead of the S25 KV-25F, and the rotation speed of the high speed homogenizing mixer was 11,000 rpm for 1 minute. After the reaction was completed, the polymerization product was washed, dried, and quantified. As a result, the amount of the resultant polymerization product was 2230 g (Yield: 61.7%). No polymer was found on an innerwall of the reactor and the mixer. The polymerization product had a weight average molecular weight of 379,000, a molecular weight distribution of 2.83, and a syndiotactic stereoregularity of 93% or more.

Example 4

The rotation speed of the high speed homogenizing mixer was maintained at 4,000 rpm for 1 minute under the same experimental conditions as in Example 3, and other conditions were the same as in Example 1. After the reaction was completed, the polymerization product was washed, dried, and quantified. As a result, the amount of the resultant polymerization product was 2213 g (Yield: 61.3%). No polymer was found on an innerwall of the reactor and the mixer. The polymerization product had a weight average molecular weight of 381,000, a molecular weight distribution of 2.57, and a syndiotactic stereoregularity of 93% or more.

Example 5

Instead of a 5 L reactor, a continuously-operating high speed homogenizing mixer S25 KV-F-IL was installed onto a front end portion of a 20 L reactor. 37.5 ml of 1.0M triisobutylaluminum toluene solution (Aldrich) and 49.2 ml of methylaluminoxane toluene solution containing 4.68 wt % of aluminum (Albermarl) were sequentially added to 4,000 ml of a refined stylene monomer, and then well mixed to prepare a monomer/cocatalyst mixture. Then, the monomer/cocatalyst mixture and 37.5 ml of 0.005M pentamethylcyclopentadienyltitaniumtrimetoxide (Cp*Ti(OME)$_3$) toluene solution were continuously loaded to a high speed homogenizing mixer using a pump at a flow speed of 817.0 ml/min and 7.5 ml/min, respectively. At this time, the mixing speed of the high speed homogenizing mixer was 24,000 rpm. In addition, since the reactants were continuously loaded and passed the high speed homogenizing mixer, the mixing time was very short. In the present experiment, the reactants passed the high speed homogenizing mixer at a rate of 5 L-10 L per minute. The homogenized monomer/cocatalyst/catalyst mixture simultaneously discharged from the high speed homogenizing mixer was loaded to the 20 L reactor and at the same time the reaction was initiated. At this time, the rotation speed of a mixing blade was maintained at 80 rpm. The reaction time was 1 hour. Then, the reactor was evacuated to completely collect the unreacted monomers and a valve of the reactor was opened to obtain polymer powder. No polymer was found on an inner wall of the reactor and the mixer. The obtained polymerization product was sufficiently washed using excess methanol containing a small amount of HCl, and dried in a vacuum oven. The resultant product was quantified. As a result, the powder polymerization product had an amount of 2300 g (Yield: 63.7%). The polymerization product has a weight average molecular weight of 367,000 and a molecular weight distribution of 2.65. As a result of NMR analysis, the polymerization product showed a syndiotactic stereoregularity of 93% or more.

Comparative Example

The experimental conditions were the same as in Example 1, except that instead of the high speed homogenizing mixer, a 45FIG. pitch blade including magnetic drive type mixer-mounted reactor was used to mix a monomer/cocatalyst mixture and a catalyst mixture at 1,200 rpm for 2 minutes. After the reaction was completely performed, the reaction product was washed, dried, and then quantified. As a result, the amount of the resultant polymer powder was 1,571 g, and the residual polymer attached to an inner wall of the reactor and the mixer was forced to be removed. The amount of the removed residual polymer was 233 g. That is, the entire amount of the polymer generated was 1,804 g (yield: 50.0%), but only 87% of the entire polymer was able to be collected, whereas when high speed homogenizing mixers are used as in Examples 1 through 5, 100% of the polymer generated was able to be collected. The polymerization product had a weight average polymer of 388,000, a molecular distribution of 2.52, and a syndiotactic stereoregularity of 93% or more.

According to the present invention, catalyst is quickly dispersed among monomers using a high speed homogenizing mixer so that formation of gel, which occurs when a syndiotactic styrene polymer is produced, can be fundamentally prevented, and a styrene polymer having high activity, good steregularity, and uniform molecular distribution can be prepared.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing styrene polymer, the method comprising:
   homogeneously mixing a styrene monomer; a cocatalyst mixture of Group 13 metal-containing organic metal compound cocatalyst and an inert organic solvent; and a catalyst mixture of a metallocene catalyst and the inert organic solvent using a high speed homogenizing mixer to obtain a mixed and homogenized mixture; and providing the homogenized mixture to a reactor to initiate polymerization.

2. The method of claim 1, wherein the styrene monomer comprises at least a material selected from the group consisting of alkylstyrene, halogenized styrene, halogen-substituted alkylstyrene, alkoxystyrene, vinylbiphenyl, vinylphenyl naphthalene, vinylphenylpyrene, vinylphenylanthracene, trialkylsilylvinylbiphenyl, alkylsilylstyrene, carboxymethylstyrene, alkylesterstyrene, vinylbenzenesulfonic acid ester, vinylbenzyldialkoxyphosphate, divinylbenzene, trivinylbenzene, and aryl styrene.

3. The method of claim 1, wherein the metallocene catalyst is a bonding product of a Group 4 transition metal compound and a ligand selected from the group consisting of one or two cycloalkyldienyl group and a derivative thereof.

4. The method of claim 1, wherein the amount of the metallocene catalyst is in the range of 0.00005-0.02 mol % for a total amount of the metallocene catalyst and the styrene monomer.

5. The method of claim 1, wherein, the cocatalyst comprises at least one material selected from the group consisting of alkylaluminoxane, alkylaluminum compound, and a borate compound.

6. The method of claim 5, wherein the alkylaluminoxane is methylaluminoxane (MAO) or modified methylaluminoxane (MMAO).

7. The method of claim 5, wherein the alkylaluminum compound is selected from the group consisting of trimethylaluminum, triethylaluminum, dimethylaluminum chloride, diethylaluminum chloride, triisobutylaluminum, tri(N-butyl)aluminum, tri n-(propyl)aluminum, and triisopropylaluminum.

8. The method of claim 5, wherein the borate compound comprises at least one material selected from the group consisting of borate, triphenylcarboniumtetra(pentafluorophenyl)borate, o-cyano-N-methylpyridiumtetra(pentafluorophenyl)borate, tri(pentafluorophenyl)boron, 1,1-dimethylferrocenium-tetra(pentafluorophenyl)borate, and benzyldimethylferrocenlium tetra(pentafluorophenyl)borate.

9. The method of claim 1, wherein the amount of the cocatalyst, based on the amount of the metal comprised in the cocatalyst, is in the range of 10-1,000 mol for 1 mole of metal comprised in the metallocene catalyst.

10. The method of claim 1, wherein the inert organic solvent comprises least one material selected from the group consisting of pentane, hexane, cyclohexane, heptane, octane, nonane, decane, benzene, pentafluorobenzene, and toluene.

11. The method of claim 1, wherein the concentration of the catalyst mixture is in the range of 0.0001-0.1 M for the inert organic solvent.

12. The method of claim 1, wherein the polymerization is performed at a temperature of 0-120° C.

13. The method of claim 1, wherein in the homogenously mixing, the styrene monomer and the cocatalyst mixture are homogenized using a first high speed homogenizing mixer, and then the resultant homogenized mixture and the catalyst mixture are homogenized using a second high speed homogenizing mixer.

14. The method of claim 1, wherein in the homogenously mixing, the styrene monomer and the cocatalyst mixture are homogenized to form a first homogenized product and the styrene monomer and the catalyst mixture are homogenized to form a second homogenized product, using a pair of first high speed homogenizing mixers respectively, and then the first and second homogenized products are homogenized using a second high speed homogenizing mixer.

15. The method of claim 1, wherein the rotation speed of the high speed homogenizing mixer is in the range of 1,000-50,000 rpm.

16. The method of claim 1, wherein the reactor comprises:
   a main body having an inner space comprising:
      an inlet to which the homogenized mixture is fed; and
      an outlet from which a reaction product is discharged;
   a stirrer stirring the homogenized mixture installed in the main body; and
   a temperature controlling unit connected to the main body which controls a reaction temperature by circulating heated oil and refrigerated oil, wherein
   an anchor blade is attached to the mixer, an interval between the anchor and an inner wall of the reactor is minimized, and heated and refrigerated oil circulates along the anchor.

17. The method of claim 1, wherein the reactor is a powder bed type reactor.

18. The method of claim 1, wherein the rotation speed of the high speed homogenizing mixer is in the range of 10-100,000 rpm.

19. The method of claim 1, wherein the rotation speed of the high speed homogenizing mixer is in the range of 100-50,000 rpm.

* * * * *